US010957924B2

(12) United States Patent
Matsuo et al.

(10) Patent No.: US 10,957,924 B2
(45) Date of Patent: Mar. 23, 2021

(54) FUEL CELL SYSTEM AND METHOD FOR CONTROLLING THE FUEL CELL SYSTEM

(71) Applicant: TOYOTA JIDOSHA KABUSHIKI KAISHA, Toyota (JP)

(72) Inventors: Junichi Matsuo, Okazaki (JP); Tomotaka Ishikawa, Nagoya (JP); Tomohiro Ogawa, Miyoshi (JP); Tomio Yamanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 16/505,847

(22) Filed: Jul. 9, 2019

(65) Prior Publication Data
US 2020/0036017 A1    Jan. 30, 2020

(30) Foreign Application Priority Data

Jul. 27, 2018    (JP) .............................. JP2018-140813

(51) Int. Cl.
*H01M 8/04223*    (2016.01)
*H01M 8/04228*    (2016.01)
(Continued)

(52) U.S. Cl.
CPC ... *H01M 8/04253* (2013.01); *H01M 8/04164* (2013.01); *H01M 8/04228* (2016.02); *H01M 8/04843* (2013.01); *H01M 8/04955* (2013.01)

(58) Field of Classification Search
CPC ......... H01M 8/04253; H01M 8/04228; H01M 8/04164
See application file for complete search history.

(56) References Cited

U.S. PATENT DOCUMENTS

| 2008/0053530 A1* | 3/2008 | Knight ............. H01M 8/04156 137/341 |
| 2016/0141693 A1* | 5/2016 | Hotta ................ H01M 8/04164 429/414 |

(Continued)

FOREIGN PATENT DOCUMENTS

| JP | 2007035369 A | 2/2007 |
| JP | 2008041346 A | 2/2008 |

(Continued)

OTHER PUBLICATIONS

Machine Translation of JP2011-048922 (Jan. 2021) (Year: 2021).*

*Primary Examiner* — Matthew J Merkling
(74) *Attorney, Agent, or Firm* — Dickinson Wright PLLC (57) ABSTRACT

A fuel cell system comprises a fuel cell, a gas-liquid separator, a drain flow path through which moisture is discharged from the gas-liquid separator, a valve configured to control discharge of the moisture from the gas-liquid separator, and a controller configured to control fuel cell operation and opening and closing of the valve, and determine whether the valve is frozen. Upon receipt of a stop request of the fuel cell during the fuel cell operation, the controller repeatedly determines whether the valve is frozen. If the controller determines that the valve is frozen, it continues the fuel cell operation until it determines that the valve is not frozen. If the controller determines that the valve is not frozen, it executes stop processing of the fuel cell including opening valve processing.

5 Claims, 6 Drawing Sheets

(51) Int. Cl.
  *H01M 8/04119* (2016.01)
  *H01M 8/04955* (2016.01)
  *H01M 8/04828* (2016.01)

(56) References Cited

U.S. PATENT DOCUMENTS

| | | | | |
|---|---|---|---|---|
| 2016/0380286 | A1* | 12/2016 | Yamanaka | H01M 8/04664 |
| | | | | 320/103 |
| 2017/0069922 | A1* | 3/2017 | Yamanaka | H01M 8/04253 |
| 2018/0294493 | A1* | 10/2018 | Ogawa | H01M 8/2475 |
| 2018/0342749 | A1* | 11/2018 | Okamura | H01M 8/04253 |
| 2019/0198898 | A1* | 6/2019 | Okamura | H01M 8/04268 |
| 2019/0379075 | A1* | 12/2019 | Sinha | H01M 8/04104 |

FOREIGN PATENT DOCUMENTS

| | | | |
|---|---|---|---|
| JP | 2011048922 A | * | 3/2011 |
| JP | 2011048922 A | | 3/2011 |

* cited by examiner

FUEL CELL SYSTEM AND METHOD FOR CONTROLLING THE FUEL CELL SYSTEM

CROSS REFERENCE TO RELATED APPLICATIONS

The present application claims priority to Japanese Patent Application No. 2018-140813, filed on Jul. 27, 2018, the contents of which are incorporated herein by reference in their entirety.

BACKGROUND

Field

The present disclosure relates to a fuel cell system.

Related Art

Improvement in fuel efficiency may sometimes require a configuration in which moisture is separated from anode off gas exhausted from a fuel cell and the off gas from which the moisture has been separated is supplied to the fuel cell for reuse. In addition, this configuration may include a gas-liquid separator configured to separate the moisture from the anode off gas to store it and a valve configured to control discharge of water from the gas-liquid separator. If the valve is frozen in a low-temperature environment, the water accumulated in the gas-liquid separator cannot be discharged. In this regard, a method for suppressing the freezing of the valve is proposed. For example, JP 2007-35369A discloses a method by which power generation continues without anode gas supply when fuel cell operation is stopped so that a flow path connected to the valve will have a negative pressure. The valve is opened in such circumstances so that atmosphere will flow in toward the valve and move the water accumulated in a vicinity of the valve to another place.

However, when a vehicle is driven for a short time below the freezing point, the gas-liquid separator and the valve may not be fully warmed by waste heat of the fuel cell and stay frozen. The valve in such a state cannot be opened by the method disclosed in JP 2007-35369A, and thus water generated by the power generation is accumulated in the gas-liquid separator and not discharged at all. Subsequently, if the vehicle stops while the water accumulated in the gas-liquid separator and in the vicinity of the valve has increased, more water will freeze, which will make it harder to defrost the valve.

SUMMARY

According to one aspect of the present disclosure, a fuel cell system is provided. The fuel cell system comprises a fuel cell, a gas-liquid separator configured to separate moisture from anode off gas exhausted from the fuel cell, a drain flow path through which the moisture separated by the gas-liquid separator is discharged from the gas-liquid separator, a valve provided on the drain flow path and configured to control discharge of the moisture from the gas-liquid separator, and a controller configured to control fuel cell operation and opening and closing of the valve, and determine whether the valve is frozen. Upon receipt of a stop request of the fuel cell during the fuel cell operation, the controller repeatedly determines whether the valve is frozen. If the controller determines that the valve is frozen, it continues the fuel cell operation until it determines that the valve is not frozen. If the controller determines that the valve is not frozen, it executes stop processing of the fuel cell including opening valve processing.

DETAILED DESCRIPTION

A. First Embodiment

A1. System Configuration

Figure 1:
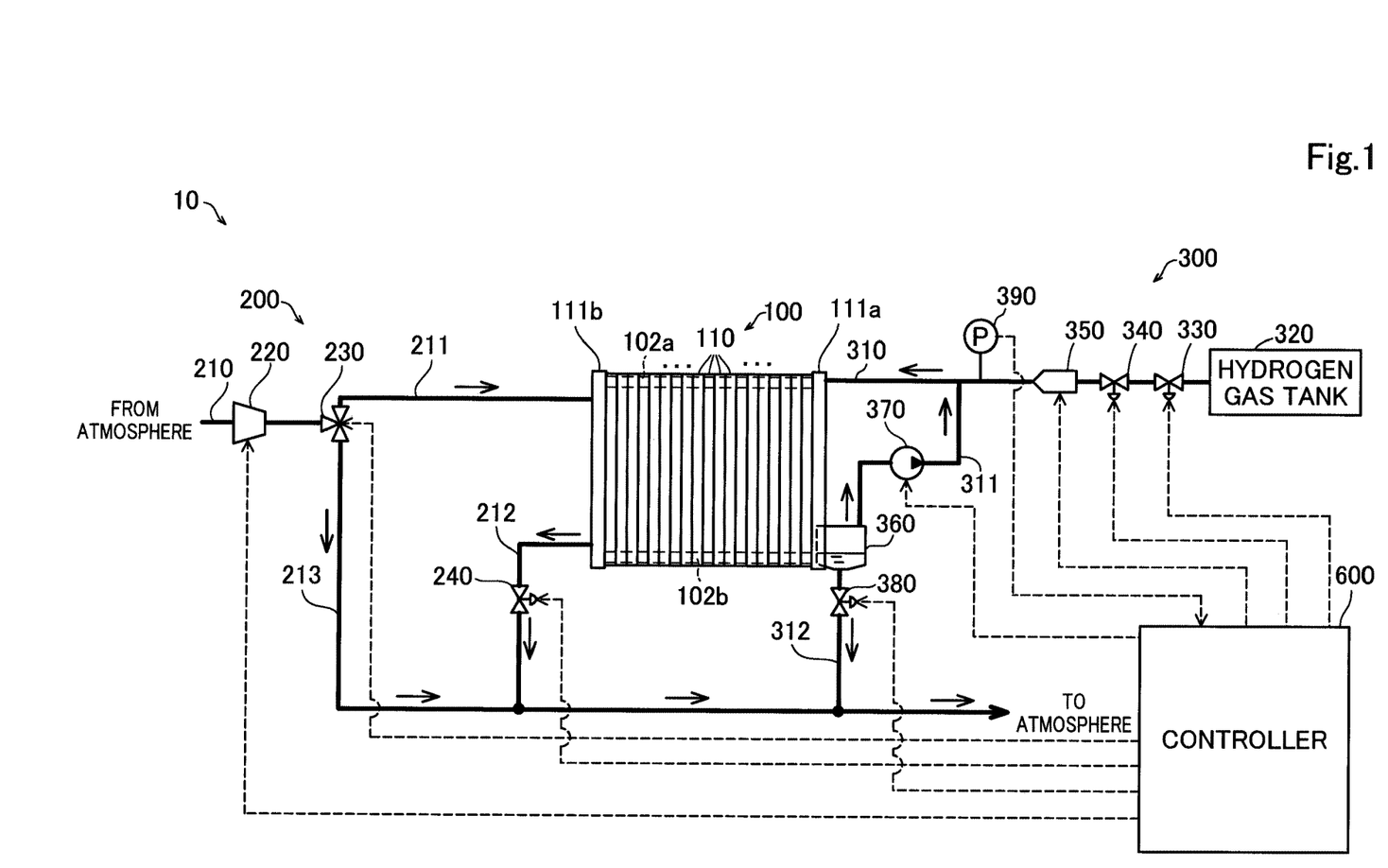
FIG. 1 is a block diagram illustrating a schematic configuration of a fuel cell system according to one embodiment of the present disclosure.

FIG. 1 is a block diagram illustrating a schematic configuration of a fuel cell system 10 according to one embodiment of the present disclosure. The fuel cell system 10 generates electric power through electrochemical reaction between anode gas and cathode gas in a fuel cell 100 and output it. In the present embodiment, the fuel cell system 10 is installed in a vehicle and supplies the electric power to a traction motor of the vehicle. The fuel cell system 10 includes the fuel cell 100, a cathode-side gas supply-discharge mechanism 200, an anode-side gas supply-discharge mechanism 300, and a controller 600.

The fuel cell 100 includes a cell stack including a plurality of unit cells 110 stacked in layers and a pair of end plates 111a and 111b. Each of the plurality of unit cells 110 includes an anode-side catalyst electrode layer and a cathode-side catalyst electrode layer sandwiching a solid polymer electrolyte membrane, and an anode-side gas diffusion layer and a cathode-side gas diffusion layer each provided outside the respective catalyst electrode layers. The anode-side catalyst electrode layer is supplied with hydrogen gas serving as anode gas. The cathode-side catalyst electrode layer is supplied with air serving as cathode gas. The catalyst electrode layers on both sides each include a catalyst such as carbon particles carrying platinum (Pt) and an electrolytic resin. The gas diffusion layers on both sides are each formed of a porous body. The porous body to be used is, for example, a carbon porous body, such as carbon paper and carbon cloth, or a metal porous body, such as a metal mesh and a metal foam. In the fuel cell 100, a plurality of manifolds are formed along a stacking direction. The anode gas, the cathode gas, the anode off gas, cathode off gas, and coolant flow in the plurality of manifolds. FIG. 1 shows an anode gas supply manifold 102a and an anode off gas discharge manifold 102b as representatives. The pair of end plates 111*a* and 111*b* each have a substantially plate-like outer shape and are provided on both ends of the fuel cell 100 in the stacking direction. The end plate 111*a* includes a through hole forming an end portion of each manifold in the thickness direction of the plate. In FIG. 1, the cathode-side gas supply-discharge mechanism 200 is connected to the fuel cell 100 by the end plate 111*b*; however, it may be connected to the fuel cell 100 by the end plate 111*a* instead of the end plate 111*b*.

The cathode-side gas supply-discharge mechanism 200 is in charge of supplying the cathode gas to the fuel cell 100 and discharging the cathode off gas from the fuel cell 100. The cathode-side gas supply-discharge mechanism 200 includes a cathode gas inflow flow path 210, a cathode supply flow path 211, a cathode discharge flow path 212, a bypass flow path 213, an air compressor 220, a three-way valve 230, and a back pressure valve 240.

The cathode gas inflow flow path 210 is used to take in air from the atmosphere. An end of the cathode gas inflow flow path 210 is open to the atmosphere while the other end is connected to the three-way valve 230. The cathode supply flow path 211 introduces compressed air output by the air compressor 220 to the fuel cell 100. An end of the cathode supply flow path 211 is connected to the three-way valve 230 while the other end is connected to a cathode supply manifold. The cathode discharge flow path 212 introduces the anode off gas exhausted from the fuel cell 100 to the outside. An end of the cathode discharge flow path 212 is connected to a cathode off gas discharge manifold in the fuel cell 100 while the other end is connected to the bypass flow path 213. The bypass flow path 213 is used to discharge part of the compressed air output by the air compressor 220 without sending it through the fuel cell 100. An end of the bypass flow path 213 is connected to the three-way valve 230 while the other end is open to the atmosphere. In addition to the cathode discharge flow path 212 described above, a drain flow path 312, described later, is also connected to the bypass flow path 213. The cathode off gas exhausted from the fuel cell 100 through the cathode discharge flow path 212 and the moisture and the anode off gas discharged through the drain flow path 312 are discharged to the atmosphere by air flowing into the bypass flow path 213 from the air compressor 220. In this regard, "the moisture discharged through the drain flow path 312" includes the moisture separated by the gas-liquid separator 360. Additionally, the moisture includes liquid water, vapor water, and mist-like water.

The air compressor 220 is provided on the cathode gas inflow flow path 210. An air cleaner, not shown, removes foreign objects such as dust in air and the air compressor 220 takes in the resultant air to compress and output. The three-way valve 230 connects the cathode gas inflow flow path 210, the cathode gas supply flow path 211, and the bypass flow path 213. The three-way valve 230 adjusts flow rates of the compressed air, output from the air compressor 220, sent to the cathode supply flow path 211 and the bypass flow path 213. The back pressure valve 240 is provided on the cathode discharge flow path 212 and adjusts gas pressure of the cathode off gas on a discharge side in the fuel cell 100.

The anode-side gas supply-discharge mechanism 300 is in charge of supplying the anode gas to the fuel cell 100 and discharging the anode off gas from the fuel cell 100. The anode-side gas supply-discharge mechanism 300 includes an anode gas supply flow path 310, a circulation flow path 311, the drain flow path 312, a hydrogen gas tank 320, a shutoff valve 330, a pressure control valve 340, an injector 350, the gas-liquid separator 360, a pump 370, a gas-liquid discharge valve 380, and a pressure sensor 390.

The anode gas supply flow path 310 introduces the anode gas to the fuel cell 100. An end of the anode gas supply flow path 310 is connected to the hydrogen gas tank 320 while the other end is connected to the anode gas supply manifold 102*a* in the fuel cell 100. The circulation flow path 311 connects the gas-liquid separator 360 with the anode gas supply flow path 310. The circulation flow path 311 and the anode gas supply flow path 310 is connected between the injector 350 and the fuel cell 100. The drain flow path 312 is used to discharge the moisture separated by the gas-liquid separator 360 from the gas-liquid separator 360. An end of the drain flow path 312 is connected to the gas-liquid separator 360 while the other end is connected to the bypass flow path 213.

The hydrogen gas tank 320 stores high-pressure hydrogen gas serving as the anode gas. The shutoff valve 330 is provided in a vicinity of the hydrogen gas tank 320 on the anode gas supply flow path 310 so as to switch operations to enable and disable the hydrogen gas supply from the hydrogen gas tank 320. The pressure control valve 340 is provided on a downstream side of the shutoff valve 330 and an upstream side of the injector 350, on the anode gas supply flow path 310. The pressure control valve 340 lowers primary pressure on its upstream side so as to adjust secondary pressure on its downstream side to predetermined pressure. The injector 350 is provided on a downstream side of the pressure control valve 340 on the anode gas supply flow path 310. The injector 350 injects the anode gas to the fuel cell 100. At this time, adjustment of an injection cycle and injection duty of the anode gas of the injector 350 can adjust anode gas supply amount to the fuel cell 100 and gas pressure of the anode gas supply flow path 310. The injection duty means a rate of injection time of hydrogen gas to each cycle of the injection cycle.

The anode gas is supplied to each of the unit cells 110 through the anode gas supply manifold 102*a*. Part of the anode gas thus supplied is consumed in each of the unit cells 110 and remaining unused anode gas is discharged as the anode off gas to the gas-liquid separator 360 via the anode off gas discharge manifold 102*b*. The gas-liquid separator 360 separates the moisture from the anode off gas exhausted from the fuel cell 100. The anode off gas includes nitrogen gas permeated from the cathode side to the anode side via the electrolyte membrane, in addition to remaining hydrogen gas unused for the electrochemical reaction in each of the unit cells 110. Moreover, the anode off gas includes water permeated from the cathode side to the anode side via the electrolyte membrane in each of the unit cells 110. The gas-liquid separator 360 separates the moisture included in the anode off gas from the anode off gas. In the present embodiment, the gas-liquid separator 360 includes a concavity provided in the end plate 111*a* and a cover member covering the concavity. The concavity provided in the end plate 111*a* is open to an outer surface of the end plate 111*a* and has a shape with the thickness direction of the end plate 111*a* matching its depth direction. The concavity includes a communication hole to the anode off gas discharge manifold 102*b*. Inside the cover member is formed a concavity similar to the concavity provided in the end plate 111*a*. These two concavities face each other and communicate with each other so as to form a space for separating the moisture from the gas and storing the moisture. The space is hereinafter referred to as a "separation space". The anode off gas flows into the separation space and hits against an inside wall surface, so that the moisture in the anode off gas is condensed and led to a lower part of the separation space. In the bottom of the separation space, a communication hole communicating with the drain flow path 312 is formed. When the gas-liquid discharge valve 380 is closed, water is accumulated in the separation space. On the contrary, when the gas-liquid discharge valve 380 is open, the water accumulated in the separation space is discharged. In an upper part of the separation space, a communication hole communicating with the circulation flow path 311 is formed. The anode off gas, from which the moisture has been separated, flows into the circulation flow path 311 through this communication hole. Since the gas-liquid separator 360 includes part of the end plate 111a as its constituting member, waste heat generated by the operation of the fuel cell 100 is easily transmitted to the gas-liquid separator 360.

The pump 370 is provided on the circulation flow path 311, and supplies the anode off gas from which the moisture has been separated by the gas-liquid separator 360 to the anode gas supply flow path 310. The anode off gas from which the moisture has been separated includes the remaining anode gas unused in each of the unit cells 110, as described above. Therefore, in the fuel cell system 10 in the present embodiment, such anode off gas is returned to the anode gas supply flow path 310 so as to be supplied to the fuel cell system 100 again. Thus, fuel efficiency is improved.

The gas-liquid discharge valve 380 is provided on the drain flow path 312 to control moisture discharge from the gas-liquid separator 360. The gas-liquid discharge valve 380 is provided in contact with the gas-liquid separator 360 in the present embodiment. The gas-liquid discharge valve 380 includes an on-off valve in the present embodiment. Accordingly, it can be selectively set to either an open state or a closed state. When the gas-liquid discharge valve 380 is in the open state, the separation space, described above, communicates with the drain flow path 312, so that the water accumulated in the gas-liquid separator 360 is discharged to the drain flow path 312 via the gas-liquid discharge valve 380. On the contrary, when the gas-liquid discharge valve 380 is in the closed state, the separation space does not communicate with the drain flow path 312, so that the water accumulated in the gas-liquid separator 360 is not discharged. Additionally, the gas-liquid discharge valve 380 may be any other kind of valve that allows to select multiple opening degrees, instead of the on-off valve.

The pressure sensor 390 detects the gas pressure in the anode gas supply flow path 310. The gas pressure is hereinafter referred to as "anode supply pressure". In the present embodiment, the pressure sensor 390 is provided on the anode gas supply flow path 310 at a place closer to the hydrogen gas tank 320 than to the connecting place of the circulation flow path 311 to the anode gas supply flow path 310. As described above, the anode gas supply flow path 310 is supplied with the hydrogen gas injected by the injector 350 and the anode off gas sent by the pump 370 through the circulation flow path 311. Therefore, the pressure sensor 390 detects total pressure of these gases as the anode supply pressure.

The controller 600 executes control of the operation of the fuel cell 100 and control of opening and closing of the gas-liquid discharge valve 380, and determination of whether the gas-liquid discharge valve 380 is frozen. In the present embodiment, the controller 600 includes a computer including a CPU (Central Processing Unit), a RAM (Random Access Memory) and a ROM (Read Only Memory). The CPU serves as a functional part and executes control programs stored in the ROM in advance so as to execute the control of the operation of the fuel cell 100, the control of the opening and closing of the gas-liquid discharge valve 380, and the determination of whether the gas-liquid discharge valve 380 is frozen. In the present embodiment, each of the aforementioned valves such as the three-way valve 230, back pressure valve 240, shutoff valve 330, pressure control valve 340, and gas-liquid discharge valve 380 is a solenoid valve and electrically connected to the controller 600. The controller 600 controls opening degree or on-off switching of each of these valves 230, 240, 330, 340, and 380. Moreover, the controller 600 is electrically connected to the air compressor 220, the injector 350 and the pump 370, and controls operation of them.

The controller 600 executes overall control of the fuel cell system 10 relating to the operation of the fuel cell 100, in addition to the control of the operation of the fuel cell 100, the control of the opening and closing of the gas-liquid discharge valve 380, and the determination of whether the gas-liquid discharge valve 380 is frozen, as described above. For example, the controller 600 receives an operation request and a stop request transmitted from a vehicle controller mounted on a vehicle, and executes the operation of the fuel cell 100 or system stop processing, described later, in response to these requests. When executing the operation of the fuel cell 100, the controller 600 uses information of accelerator opening degree and vehicle speed received from the vehicle controller and information on operation states of auxiliary machines so as to determine an operating point of the fuel cell 100 including an output current value and an output pressure value. In order to implement the operating point, the controller 600 determines flow rates of hydrogen gas and air to be supplied to the fuel cell 100. In order to implement the flow rates of hydrogen gas and air thus determined, the controller 600 controls each of the valves such as the shutoff valve 330, pressure control valve 340, three-way valve 230, and back pressure valve 240, the injector 350, the pump 370, and the air compressor 220. In addition, the controller 600 periodically transmits an opening instruction to the gas-liquid discharge valve 380 during the operation of the fuel cell 100 so as to control the discharge of the water accumulated in the gas-liquid separator 360. Moreover, the controller 600 performs feedback control in which an injection amount and injection duty of the injector 350 are controlled based on the pressure value detected by the pressure sensor 390.

The fuel cell system 10 further includes a cooling medium circulating mechanism and a power supply circuit, omitted in FIG. 1, in addition to the fuel cell 100, the cathode-side gas supply-discharge mechanism 200, and the anode-side gas supply-discharge mechanism 300 described above. The cooling medium circulating mechanism circulates coolant through the circulation flow path including a cooling medium supply manifold and a cooling medium discharge manifold provided in the fuel cell 100 so as to adjust the temperature in the fuel cell 100. The cooling medium circulating mechanism includes a radiator, a pump to circulate the coolant and so forth, in addition to the circulation flow path for the coolant described above. The power supply circuit supplies electric power from at least one of the fuel cell 100 and a secondary battery to the traction motor and various auxiliary machines mounted on the vehicle. The power supply circuit includes a DC-DC converter, an inverter, and so forth.

The aforementioned anode gas supply flow path 310 corresponds to the supply flow path described in SUM- MARY. The gas-liquid discharge valve 380 corresponds to the valve described in SUMMARY.

A2. Control of Fuel Cell System 10

The controller 600 executes the control of the fuel cell system 10, as described above. The control of the fuel cell system 10 includes system stop processing. As will be described later, the execution of the system stop processing suppresses freezing of the gas-liquid discharge valve 380.

Figure 2:
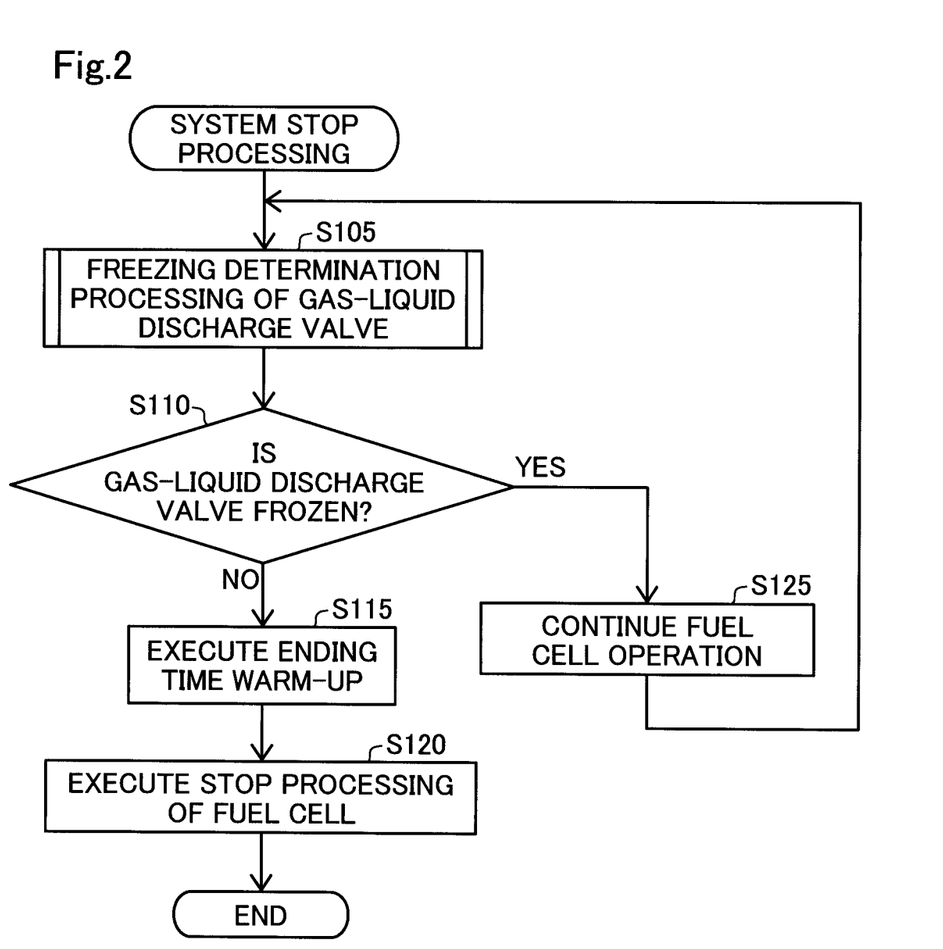
FIG. 2 is a flowchart illustrating procedures of system stop processing according to a first embodiment.

FIG. 2 is a flowchart illustrating procedures of the system stop processing according to the first embodiment. When the vehicle stops and a user performs stop operation such as pushing a stop button of the vehicle, the vehicle controller transmits a stop request of the fuel cell 100 to the controller 600. Upon receipt of the stop request by the controller 600, the system stop processing is started. Meanwhile, when the user executes the stop operation, the vehicle is at a stop, but the operation of the fuel cell 100 continues to supply the electric power to the auxiliary machines. This operation of the fuel cell 100 is hereinafter referred to as "idling operation".

The controller 600 executes determination processing to determine whether the gas-liquid discharge valve is frozen (step S105). This processing is hereinafter referred to as "freezing determination processing of the gas-liquid discharge valve". In the present embodiment, being "frozen" means the state in which the opening and closing operation of the gas-liquid discharge valve 380 is disturbed by frozen water. If the opening and closing operation of the gas-liquid discharge valve 380 is disturbed, the gas may not flow via the gas-liquid discharge valve 380. The expression "the gas may not flow" described above means broad concept including the state in which the gas flow rate is less than a predetermined flow rate, as well as the state in which no gas flows. On the contrary, being "not frozen" means the state in which the gas can flow via the gas-liquid discharge valve 380, or the gas of flow rate equal to or higher than that of the predetermined flow rate can flow. It has a broad meaning including the state in which the frozen water adheres to part of the gas-liquid discharge valve 380. With regard to the predetermined flow rate described above, it may be 100 ml (milliliter) as a total flow rate during the execution of the freezing determination processing of the gas-liquid discharge valve, for example. Note that it is not limited to 100 ml, and may be any flow rate. For example, it may be any value between 0 and 200 ml, inclusive. More preferably, it may be any value between 0 and 100 ml, inclusive.

Figure 3:
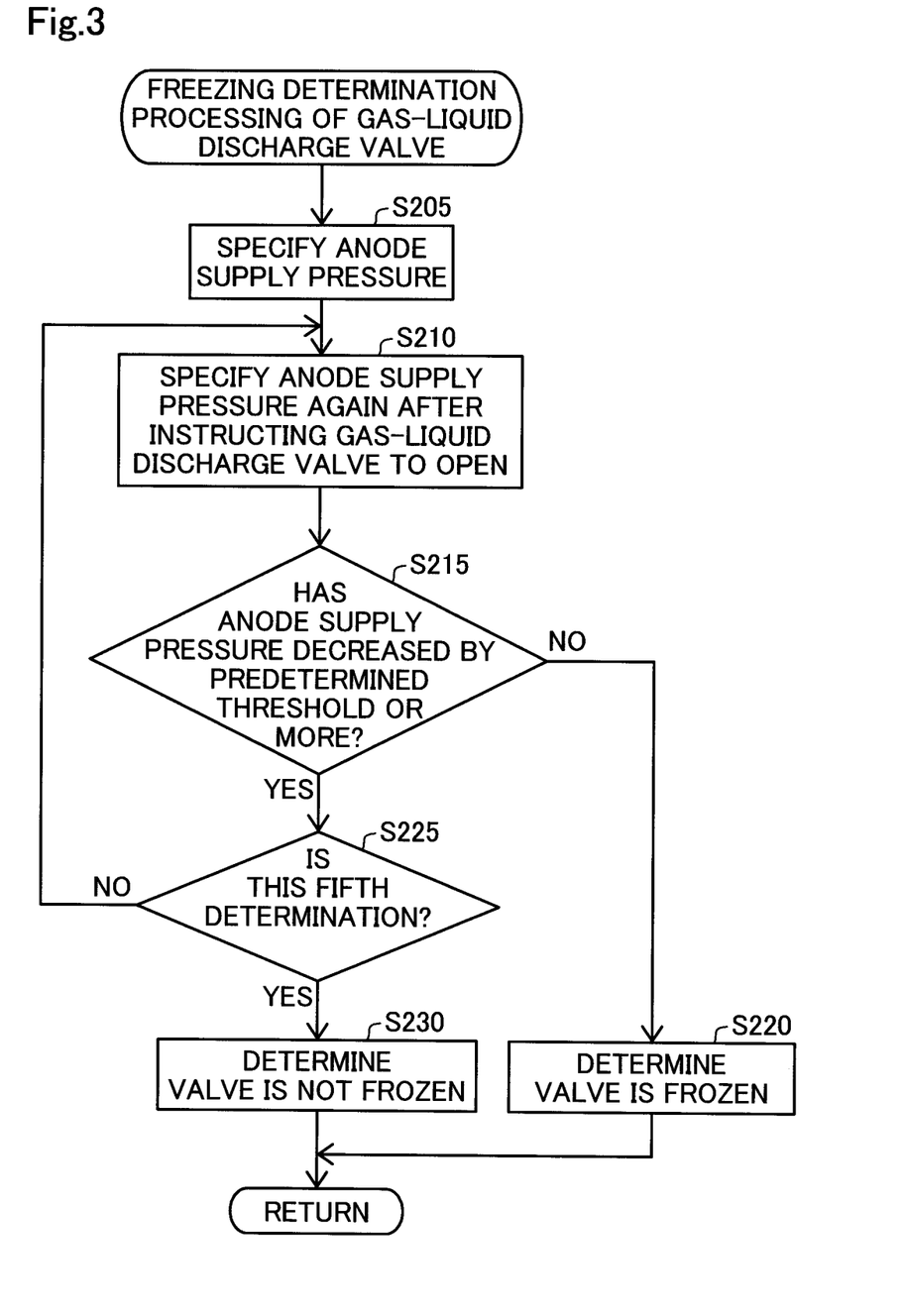
FIG. 3 is a flowchart illustrating procedures of freezing determination processing of gas-liquid discharge valve according to the first embodiment.

FIG. 3 is a flowchart illustrating procedures of the freezing determination processing of the gas-liquid discharge valve according to the first embodiment. The controller 600 receives a detection value transmitted from the pressure sensor 390 and specifies the anode supply pressure (step S205). The controller 600 instructs opening operation to the gas-liquid discharge valve 380 and specifies the anode supply pressure again (step S210). As described above, the controller 600 periodically instructs the opening operation to the gas-liquid discharge valve 380. After the execution of the opening instruction, which is executed after the step S205, the step S210 is executed to specify the anode supply pressure again.

The controller 600 determines whether the anode supply pressure specified in the step S210 is lower than the previously specified pressure by a predetermined threshold or more (step S215). The previously specified pressure is hereinafter referred to as a "previous value". If it is determined that the anode supply pressure has not decreased from the previous value by the predetermined threshold or more (step S215: NO), the controller 600 determines that the gas-liquid discharge valve 380 is frozen (step S220).

On the other hand, if it is determined that the anode supply pressure has decreased from the previous value by the predetermined threshold or more (step S215: YES), the controller 600 determines whether the determination, i.e., determination result, that "the anode supply pressure has decreased from the previous value by the predetermined threshold or more" is a fifth determination, i.e., determination result, after initiation of the freezing determination processing of the gas-liquid discharge valve (step S225). If it is determined not to be the fifth determination (step S225: NO), the processing returns to the step S210 described above. On the other hand, if it is determined to be the fifth determination (step S225: YES), the controller 600 determines that the gas-liquid discharge valve 380 is not frozen (step S230). If it is determined that "the anode supply pressure has not decreased from the previous value by the predetermined threshold or more" before the fifth determination in the step S215, the controller 600 determines that the gas-liquid discharge valve 380 is frozen and terminates the freezing determination processing of the gas-liquid discharge valve. Accordingly, if it is determined to be the fifth determination in the step S225, it means that it has been determined that "the anode supply pressure has decreased from the previous value by the predetermined threshold or more" five times consecutively. In this case, it is determined that the gas-liquid discharge valve 380 is not frozen.

Figure 4:
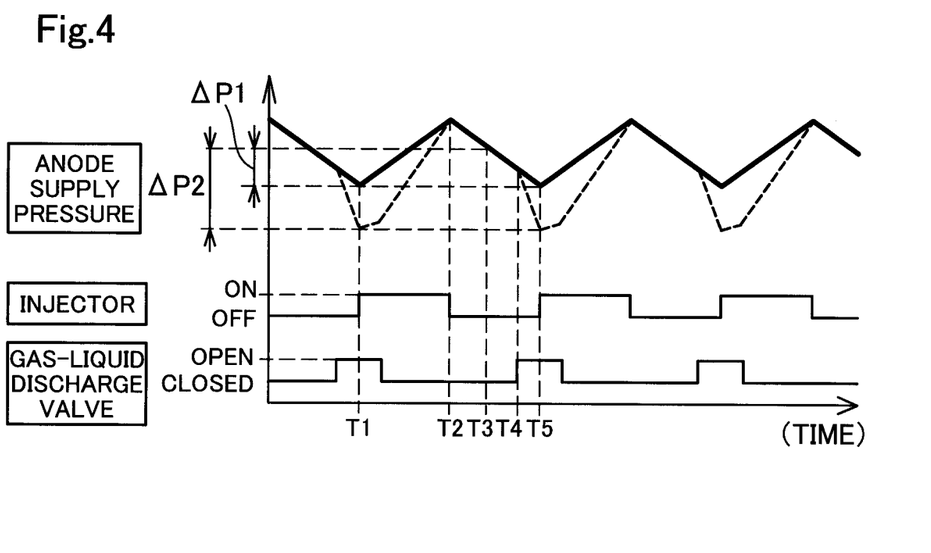
FIG. 4 is a timing chart illustrating anode supply pressure, operating states of an injector, and operation instructions to the gas-liquid discharge valve during execution of the freezing determination processing of the gas-liquid discharge valve.

FIG. 4 is a timing chart illustrating the anode supply pressure, operating states of the injector 350, and operation instructions to the gas-liquid discharge valve 380 during the execution of the freezing determination processing of the gas-liquid discharge valve. In FIG. 4, the top row represents the anode supply pressure, the middle row represents the operating states of the injector 350, and the bottom row represents the operating states of the gas-liquid discharge valve 380. In FIG. 4, the horizontal axis represents time. Additionally, the anode supply pressure in the case where the gas-liquid discharge valve 380 is frozen is shown in a bold solid line while the anode supply pressure in the case where the gas-liquid discharge valve 380 is not frozen is shown in a broken line. An "ON" operating state of the injector 350 means that the injector 350 is injecting hydrogen gas, while an "OFF" operating state of the injector 350 means that the injector 350 is not injecting hydrogen gas. An "OPEN" operating state of the gas-liquid discharge valve 380 means that the controller 600 instructs the gas-liquid discharge valve 380 to open. A "CLOSED" operating state of the gas-liquid discharge valve 380 means that the controller 600 instructs the gas-liquid discharge valve 380 to close.

The anode supply pressure rises from time T1 to time T2 during which the injector 350 injects hydrogen gas. Once the injection of hydrogen gas by the injector 350 stops at the time T2, the anode supply pressure begins to decrease according to the consumption of hydrogen gas by the fuel cell 100 and keeps decreasing until next time the injection of hydrogen gas by the injector 350 begins at time T5. If the gas-liquid discharge valve 380 is not frozen, the gas-liquid discharge valve 380 opens in response to the opening instruction at time T4, which is earlier than the time T5. As a result, the water accumulated in the gas-liquid separator 360 is discharged through the drain flow path 312, and the gas in the circulation flow path 311 is also discharged to the drain flow path 312. Consequently, a decreasing amount of the anode supply pressure per unit time drastically increases while the anode supply pressure sharply decreases, as shown by the broken line in FIG. 4.

On the contrary, in the case where the gas-liquid discharge valve 380 is frozen, the gas-liquid discharge valve 380 does not open, but stays closed even if it receives the opening instruction at the time T4. Accordingly, the water accumulated in the gas-liquid separator 360 and the gas in the circulation flow path 311 are not discharged, and the decreasing amount of the anode supply pressure per unit time does not vary from the amount before the receipt of the opening instruction. Therefore, the decreasing amount ΔP1 of the anode supply pressure at the time T5 relative to the anode supply pressure at the time T3 in the case where the gas-liquid discharge valve 380 is frozen is less than the decreasing amount ΔP2 in the case where the valve is not frozen. The time T3 is before the time T4 at which the opening instruction is transmitted, and the time T5 is after the time T4. The decreasing amount of the anode supply pressure is hereinafter simply referred to as a "decreasing pressure amount". Accordingly, the predetermined threshold in the step S215 is set to the value larger than the decreasing pressure amount ΔP1 and smaller than the decreasing pressure amount ΔP2. As a result, if the decreasing amount of the anode supply pressure is equal to or larger than the predetermined threshold, it is determined that the valve is not frozen, and if the decreasing amount is not equal to or larger than the predetermined threshold, it is determined that the valve is frozen. In the present embodiment, the time T3 is set at timing when predetermined time has passed since the time T2 at which the injector 350 has been switched from ON to OFF. The time T5 is set at timing when predetermined time has passed since the time T4 at which the controller has transmitted the opening instruction to the gas-liquid discharge valve 380. Additionally, a difference in the decreasing pressure amount between cases with and without the freezing of the gas-liquid discharge valve 380 may occur in relation to the anode supply pressure at any time before and after transmitting the opening instruction. It is not limited to the anode supply pressure at the time T3 and the time T5. Therefore, a method for setting the time T3 and the time T5 is not limited to the one described above, but any method can be adopted as long as it can set respective time before and after transmitting the opening instruction. As shown in FIG. 2, after the step S220 or S230 is executed, a step S110 is executed.

The controller 600 determines whether the gas-liquid discharge valve 380 is frozen based on the determination result of the freezing determination processing of the gas-liquid discharge valve (step S110). Determining that the gas-liquid discharge valve 380 is frozen (step S110: YES), the controller 600 continues the operation of the fuel cell 100 (step S125). As described above, during the system stop processing, the vehicle is at a stop, but the idling operation is being operated. In the step S125, the idling operation continues. After the step S125, the processing returns to the step S105 described above. The step S125 is shown as one step in FIG. 2 for the sake of convenience but can be omitted. Even in such a configuration, the idling operation continues. As described above, since part of the gas-liquid separator 360 includes the end plate 111a, if the idling operation continues, waste heat generated by the fuel cell 100 is continuously transmitted to the gas-liquid separator 360 and then, continuously transmitted from the gas-liquid separator 360 to the gas-liquid discharge valve 380. As a result, defrosting of the gas-liquid discharge valve 380 is accelerated, and while the idling operation continues, it will be determined that "the gas-liquid discharge valve 380 is not frozen" in the step S110.

Once it is determined that the gas-liquid discharge valve 380 is not frozen (step S110: NO), the controller 600 executes a ending time warm-up (step S115). The ending time warm-up means a rapid warm-up to be executed as one step of the system stop processing, and processing similar to a starting warm-up is performed. More specifically, the fuel cell 100 is operated at an operating point with lower generation efficiency compared with normal operation. For example, it is possible to execute the processing in which an amount of air to be supplied is extremely reduced compared with normal idling operation so as to deteriorate the generation efficiency. Execution of the ending time warm-up increases the waste heat of the fuel cell 100. As a result, evaporation of the moisture in the fuel cell 100 can be accelerated and discharge of water in the fuel cell 100 in the stop processing can be accelerated. The stop processing will be described later.

After the execution of the step S115, the controller 600 executes the stop processing of the fuel cell 100 (step S120). In the present embodiment, the stop processing of the fuel cell 100 includes the driving of the pump 370 and the opening operation of the gas-liquid discharge valve 380, in addition to stoppages of the injector 350 and the air compressor 220 due to a shutoff of power supply to the auxiliary machines. Driving the pump 370 increases the flow rate of the gas flowing into an anode side of the fuel cell 100, so that water in the fuel cell 100 can be discharged more. In addition, the opening operation of the gas-liquid discharge valve 380 discharges the moisture accumulated in the gas-liquid separator 360 and the moisture vaporized by the ending time warm-up in the fuel cell 100, i.e., water vapor. By the time the step S120 is executed, the gas-liquid discharge valve 380 has been defrosted by the execution of the step S115. Thus, if the opening instruction is transmitted to the gas-liquid discharge valve 380, the gas-liquid discharge valve 380 actually opens. Therefore, the moisture and the water vapor described above are actually discharged. The system stop processing is terminated after the execution of the step S120.

Figure 5:
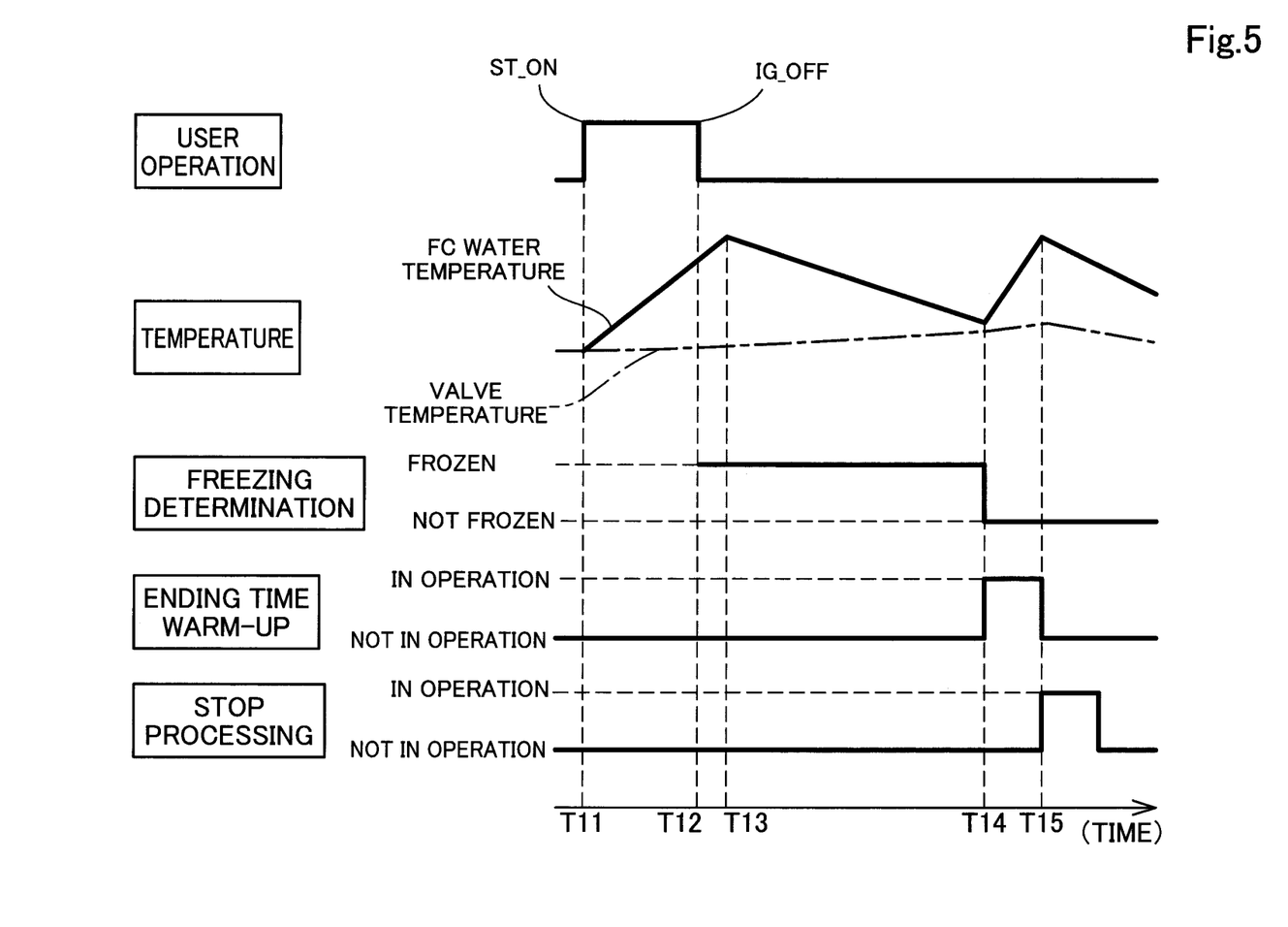
FIG. 5 is a timing chart illustrating user operation, temperature, and execution states of the freezing determination processing of the gas-liquid discharge valve, ending time warm-up processing, and stop processing of a fuel cell, in a time period from system activation to completion of the system stop processing.

FIG. 5 is a timing chart illustrating user operation, temperature, and execution states of the freezing determination processing of the gas-liquid discharge valve, the ending time warm-up processing, and the stop processing of the fuel cell 100 in a time period from system activation to completion of the system stop processing. In FIG. 5, the top row represents user operation, the second row from the top represents temperature, the third row from the top represents determination results of the freezing determination processing of the gas-liquid discharge valve, the fourth row from the top represents the ending time warm-up, and the bottom row represents the stop processing of the fuel cell 100. In FIG. 5, the horizontal axis represents time. In the "temperature" row, a bold solid line shows temperature of the coolant circulated by the cooling medium circulating mechanism, hereinafter referred to as "FC water temperature", and a fine dashed line shows temperature of the gas-liquid discharge valve 380, hereinafter referred to as "valve temperature".

When a user turns on a start switch (ST) of the vehicle at time T11, the fuel cell 100 is activated and the FC water temperature and valve temperature rise. Subsequently, the user pushes the stop switch of the vehicle (IG_OFF) at time T12. That is to say, the vehicle is driven in a time period from the time T11 to the time T12. In an example shown in FIG. 5, the gas-liquid discharge valve 380 stays frozen in the time period from the time T11 to the time T12. Such a situation may occur, for example, when the vehicle is driven for a short time in a low-temperature environment at or below 0 degree Celsius. The FC water temperature keeps rising even after the time T12 and turns to go down at time T13. The coolant warmed by the waste heat generated during the normal operation of the fuel cell 100 continues to circulate after the vehicle stops, so that the water temperature keeps rising. Subsequently, when the fuel cell shifts to the idling operation and a waste heat amount decreases, the FC water temperature turns to go down. The valve temperature begins to rise from the time T11 and keeps rising even after the time T13. This is because, due to the continuous idling operation after the time T13 (step S125), the waste heat of the fuel cell 100 is transmitted to the gas-liquid discharge valve 380. Subsequently, if it is determined that the gas-liquid discharge valve 380 is not frozen at time T14, the ending time warm-up is executed (step S115), which quickly raises the FC water temperature. Once the ending time warm-up is finished at the time T15, the FC water temperature and the valve temperature fall. At this time, the gas-liquid discharge valve 380 is not frozen, and thus the gas-liquid discharge valve 380 can open when the stop processing is executed, so that the water accumulated in the gas-liquid separator 360 and in a vicinity of the gas-liquid discharge valve 380 is discharged outside.

According to the fuel cell system 10 of the first embodiment described above, upon receipt of the stop request of the fuel cell 100 during the operation of the fuel cell 100, the controller 600 repeatedly determines whether the gas-liquid discharge valve 380 is frozen. Determining that the gas-liquid discharge valve 380 is frozen, the controller 600 continues the idling operation until it determines that the gas-liquid discharge valve 380 is not frozen. As a result, the waste heat due to the operation of the fuel cell 100 can accelerate the defrosting of the gas-liquid discharge valve 380. In addition, determining that the gas-liquid discharge valve 380 is not frozen, the controller 600 executes the stop processing of the fuel cell 100 including the opening processing of the gas-liquid discharge valve 380. Thus, the moisture accumulated in the gas-liquid separator 360 and in a vicinity of the gas-liquid discharge valve 380 can be discharged through the drain flow path 312. As a result, the freezing of the gas-liquid discharge valve 380 caused by such moisture can be suppressed.

Moreover, since the stop processing includes driving the pump 370, the flow rate of the gas supplied to the fuel cell 100 through the anode gas supply flow path 310, that is, the total flow rate of the anode off gas from which the moisture has been separated and the hydrogen gas, can be increased, compared with the state in which the pump 370 is not driven. As a result, the discharge of the moisture accumulated in the fuel cell 100 can be accelerated.

Furthermore, the controller 600 determines whether the gas-liquid discharge valve 380 is frozen based on the decreasing amount of the anode supply pressure after transmitting the opening instruction to the gas-liquid discharge valve 380 relative to the anode supply pressure before transmitting the opening instruction. Thus, the freezing of the gas-liquid discharge valve 380 can be accurately determined. When the gas-liquid discharge valve 380 is not frozen, the opening degree of the gas-liquid discharge valve 380 is increased in response to the opening instruction so as to discharge the gas in the gas-liquid separator 360 and the circulation flow path 311 along with the moisture. Thus, the gas pressure in the anode gas supply flow path 310 communicating with the circulation flow path 311 decreases. On the contrary, when the gas-liquid discharge valve 380 is frozen, the opening degree of the gas-liquid discharge valve 380 when the opening instruction is transmitted is lower, compared with the case where the gas-liquid discharge valve 380 is not frozen, and thus an amount of the gas discharged via the gas-liquid discharge valve 380 is small. Therefore, a difference occurs in the decreasing amount of the anode supply pressure before and after transmitting the opening instruction between cases with and without the freezing of the gas-liquid discharge valve 380. Consequently, according to the fuel cell system 10, the freezing of the gas-liquid discharge valve 380 can be accurately determined.

B. Second Embodiment

The system configuration of the fuel cell system 10 in the second embodiment is the same as that of the fuel cell system 10 in the first embodiment, and thus components that are the same as those in the first embodiment are denoted with the same reference numerals and detailed descriptions thereof will be omitted.

Figure 6:
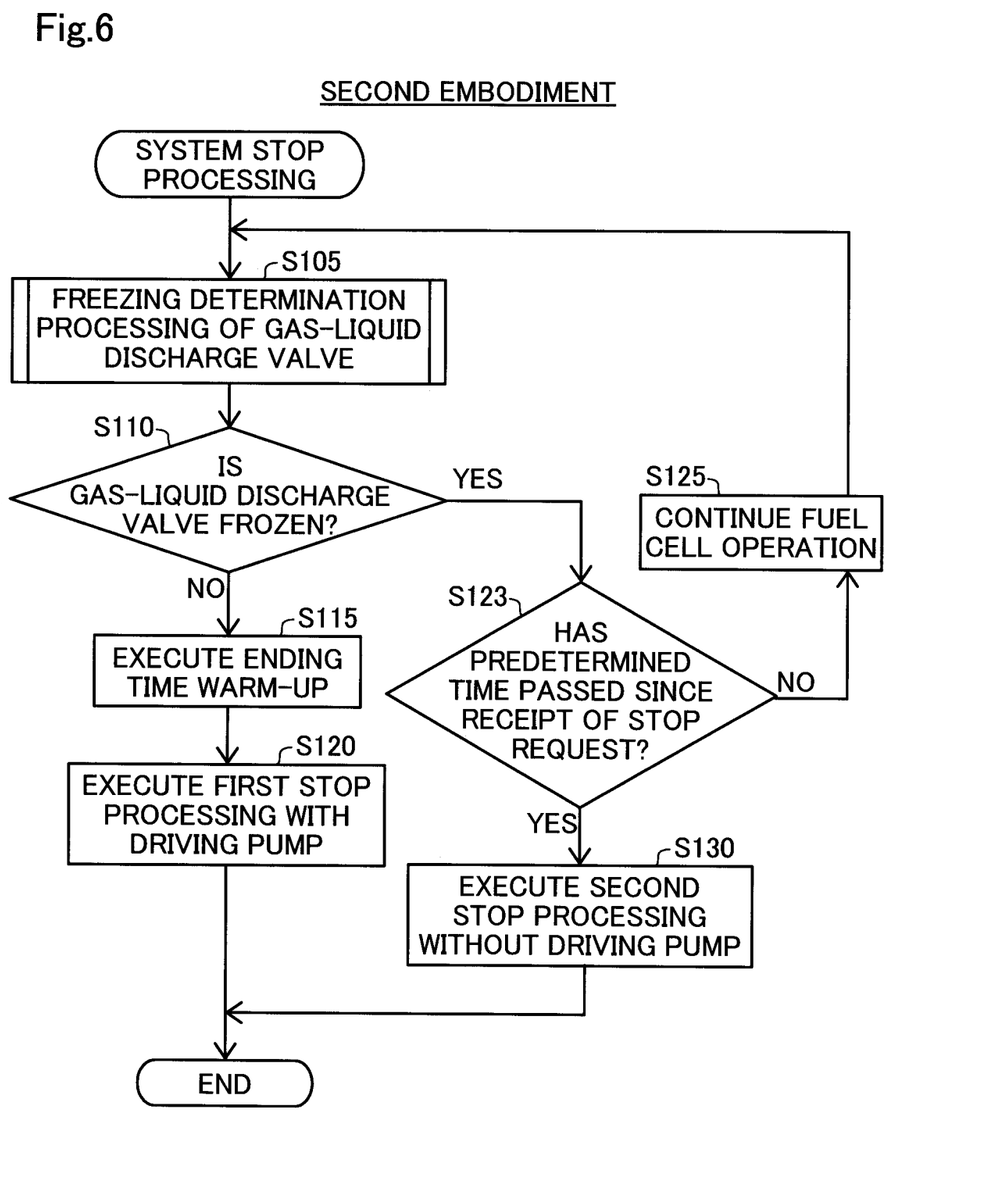
FIG. 6 is a flowchart illustrating procedures of the system stop processing according to a second embodiment.

FIG. 6 is a flowchart illustrating procedures of the system stop processing according to the second embodiment. The system stop processing in the second embodiment is different from the system stop processing in the first embodiment in that steps S123 and S130 are additionally executed. Other procedures of the system stop processing in the second embodiment are the same as those in the first embodiment, and thus the same procedures are denoted with the same reference numerals and detailed descriptions thereof will be omitted.

In the present embodiment, the stop processing of the fuel cell 100 executed in the step S120 is referred to as "first stop processing". This is to distinguish it from second stop processing that will be described later. In the first stop processing, the pump 370 is driven as described above.

Determining that the gas-liquid discharge valve 380 is frozen in the step S110 (step S110: YES), the controller 600 determines whether predetermined time has passed since the receipt of the stop request (step S123). In the present embodiment, the predetermined time is set to five minutes. Note that it is not limited to five minutes, and may be any time. If the controller determines that the predetermined time has not passed since the receipt of the stop request (step S123: NO), the step S125 described above is executed and the idling operation continues. On the contrary, if the controller 600 determines that the predetermined time has passed since the receipt of the stop request (step S123: YES), it executes the second stop processing (step S130) and the system stop processing is terminated.

The second stop processing is different from the first stop processing in that it does not drive the pump 370. Thus, the second stop processing includes the stoppages of the injector 350 and the air compressor 220 due to the shutoff of the power supply to the auxiliary machines, and the opening operation of the gas-liquid discharge valve 380. However, when the second stop processing is executed, the gas-liquid discharge valve 380 is frozen. Therefore, even if the opening instruction is transmitted, the gas-liquid discharge valve 380 cannot open.

The fuel cell system 10 in the second embodiment described above can provide the same advantageous effects as those of the fuel cell system 10 in the first embodiment. In addition, since the controller 600 executes the second stop processing excluding the driving of the pump 370 if it determines that the gas-liquid discharge valve 380 has been continuously frozen since the receipt of the stop request until the predetermined time has passed, it is possible to suppress the driving of the pump 370 while the gas-liquid discharge valve 380 is frozen. As the idling operation continues, an amount of the moisture accumulated in the gas-liquid separator 360 increases. However, since the fuel cell system 10 in the second embodiment can stop the fuel cell 100 without driving the pump 370 in such a situation, the moisture accumulated in the gas-liquid separator 360 is restrained from being sent toward and getting into the fuel cell 100 due to the driving of the pump 370. As a result, flooding can be suppressed, and thus deterioration of generation efficiency of the fuel cell 100 can be suppressed.

C. Alternative Embodiments

C1. Alternative Embodiment 1

In each of the foregoing embodiments, the stop processing or the first stop processing includes the driving of the pump 370; however, the driving of the pump 370 may be omitted. This configuration can provide the same advantageous effects as those of the foregoing embodiments. The pressure in the circulation flow path 311 is generally controlled to be equal to or higher than the atmospheric pressure to prevent inflow of gas from the atmosphere. Therefore, even in the configuration without the driving of the pump 370, the water accumulated in the gas-liquid separator 360 can be discharged by opening the gas-liquid discharge valve 380. In addition, since the configuration described above does not includes the driving of the pump 370, it is possible to restrain the water accumulated in the gas-liquid separator 360 from being sent into the fuel cell 100 by the pump 370, in other words, being drawn into the fuel cell 100. Moreover, with regard to the second stop processing in the second embodiment, the transmission of the opening instruction of the gas-liquid discharge valve 380 may be omitted. The second stop processing is executed when the gas-liquid discharge valve 380 is frozen. Therefore, the above-described configuration can save transmitting the useless opening instruction, so that power consumption by the controller 600 can be reduced.

C2. Alternative Embodiment 2

In the freezing determination processing of the gas-liquid discharge valve in each of the foregoing embodiments, the gas-liquid discharge valve 380 is determined not to be frozen if it is determined that "the anode supply pressure has decreased from the previous value by the predetermined threshold or more" five times consecutively. However, it is not limited to five times. The gas-liquid discharge valve 380 may be determined not to be frozen if it is determined that "the anode supply pressure has decreased from the previous value by the predetermined threshold or more" any number of times consecutively such as once or six times.

Moreover, in each of the foregoing embodiments, the determination of whether the gas-liquid discharge valve 380 is frozen is made based on whether the decreasing amount of the anode supply pressure after transmitting the opening instruction relative to the anode supply pressure before transmitting the opening instruction is equal to or larger than the predetermined threshold. However, the present disclosure is not limited to this. For example, values of the anode supply pressures when the opening instruction is transmitted to the gas-liquid discharge valve 380 are obtained by experiment in advance, in respective cases with or without freezing of the gas-liquid discharge valve 380. In addition, predetermined pressure ranges including the obtained values are respectively set as a pressure range with freezing and a pressure range without freezing. Then, the freezing or non-freezing of the gas-liquid discharge valve 380 may be determined based on which pressure range the anode supply pressure specified in the step S210 belongs to. Furthermore, for example, if a configuration allows the vehicle to detect outside air temperature, the controller 600 may be configured to receive the obtained outside air temperature so as to determine that the gas-liquid discharge valve 380 is frozen if the obtained outside air temperature is equal to or lower than predetermined temperature, and that the gas-liquid discharge valve 380 is not frozen if it is higher than the predetermined temperature. The predetermined temperature may be 0 degree Celsius for example. Furthermore, for example, a temperature sensor may be provided in the vicinity of the gas-liquid discharge valve 380 and the controller 600 may determine that the gas-liquid discharge valve 380 is frozen if temperature detected by the temperature sensor is equal to or lower than predetermined temperature, and that the gas-liquid discharge valve 380 is not frozen if it is higher than the predetermined temperature. The predetermined temperature may be 0 degree Celsius for example, in this configuration as well. Furthermore, for example, a gas flow rate sensor may be provided in the vicinity of the gas-liquid discharge valve 380 on a downstream side of the gas-liquid discharge valve 380 on the drain flow path 312. The controller 600 may determines that the gas-liquid discharge valve 380 is frozen if a gas flow rate detected by the gas flow rate sensor is equal to or lower than a predetermined flow rate, and that the gas-liquid discharge valve 380 is not frozen if it is higher than the predetermined flow rate. The predetermined flow rate in this configuration may be 100 ml for example. Furthermore, for example, if the gas-liquid discharge valve 380 is a solenoid valve, a current value may be measured when voltage is applied to the gas-liquid discharge valve 380, and the controller 600 may determine whether the gas-liquid discharge valve 380 is frozen by this current value. When the gas-liquid discharge valve 380 is frozen, the current flowing when the voltage is applied to the gas-liquid discharge valve 380 is higher than the current flowing when the gas-liquid discharge valve is not frozen. Therefore, the controller 600 may determine that the gas-liquid discharge valve 380 is frozen if the measured current value is equal to or higher than a threshold.

C3. Alternative Embodiment 3

In each of the foregoing embodiments, the controller 600 is configured as a computer installed in the vehicle; however, the present disclosure is not limited to this. For example, the vehicle may be configured to communicate with a management serve and the management server may serve as the controller 600. In such a configuration, the vehicle may include a communication device to receive instructions from the management server and return execution results of processing according to the instructions to the management server, and a controller to control each of the valves such as the three-way valve 230, back pressure valve 240, shutoff valve 330, pressure control valve 340, and gas-liquid discharge valve 380, the air compressor 220, the injector 350 and the pump 370 according to the instructions from the management server. The communication between the vehicle and the management server in such a configuration may be implemented using ITS (intelligent transport system), for example. Furthermore, for example, a microcomputer provided in a vehicle other than the vehicle may serve as the controller 600 in each of the embodiments. In such a configuration, the vehicle and the other vehicle may perform so-called vehicle-to-vehicle communication to transmit and receive instructions of various operation and execution results of processing according to the instructions.

C4. Alternative Embodiment 4

In each of the foregoing embodiments, the fuel cell system 10 is installed in the vehicle and used as a system to supply electric power to the traction motor; however, the present disclosure is not limited to this. For example, it may be installed and used in any other moving body that requires a driving power source, such as a ship and an air plane, instead of the vehicle. Alternatively, it may be used as a stationary power source and installed, for example, inside or outside an office or a house. Furthermore, each of the unit cells 110 included in the fuel cell 100 is for a solid polymer fuel cell; however, it may be a unit cell for various kinds of fuel cells such as a phosphoric acid fuel cell, a molten carbonate fuel cell, and a solid oxide fuel cell.

C5. Alternative Embodiment 5

The configurations of the fuel cell system 10 in the foregoing embodiments are only examples and may be modified in various ways. For example, the drain flow path 312 and the bypass flow path 213 may not be connected so as to discharge the off gas separately. Moreover, the gas-liquid separator 360 includes the end plate 111a as part of its constituting member; however, it may be a device independent of the end plate 111a. In this configuration, the gas-liquid discharge valve 380 may be separated from the gas-liquid separator 360, but connected to it via piping. Even in this configuration, the waste heat generated due to the idling operation of the fuel cell 100 is transmitted via piping connecting the fuel cell 100 to the gas-liquid separator 360 and the piping connecting the gas-liquid separator 360 to the gas-liquid discharge valve 380, so that the defrosting of the gas-liquid discharge valve 380 can be accelerated. Furthermore, the pressure sensor 390 is provided on the anode gas supply flow path 310 at a place closer to the hydrogen gas tank 320 than to the connecting place of the circulation flow path 311 to the anode gas supply flow path 310; however, it may be provided closer to the fuel cell 100 than to the connecting place.

C6. Alternative Embodiment 6

The configurations implemented by hardware in the foregoing embodiments may be partially replaced with software. Conversely, the configurations implemented by software in the foregoing embodiments may be partially replaced with hardware. For example, at least part of functions of the controller 600 may be implemented with an integrated circuit, a discrete circuit, or a module combining these circuits. If the functions according to the present disclosure are partially or entirely implemented by software, the software (computer program) can be provided while being stored in a computer-readable storage medium. This "computer-readable storage medium" is not limited to portable recording media, such as a flexible disk and a CD-ROM, but includes various internal storage devices such as a RAM and a ROM in a computer and various external storage devices such as a hard disk fixed to a computer. Thus, the "computer-readable storage medium" has a broad meaning including any storage medium that can hold data packets in a non-transitory manner.

The present disclosure is not limited to the embodiments described above, and can be implemented in various ways without departing from the spirit and scope of the present disclosure. For example, the technical features of the embodiments may be replaced or combined as appropriate, in order to solve part or all of the problems described above or in order to achieve part or all of the advantageous effects described above. Any of the technical features may be omitted appropriately unless the technical feature is described as essential in the description hereof. For example, the present disclosure may be implemented in the following aspects.

(1) According to one aspect of the present disclosure, a fuel cell system is provided. The fuel cell system comprises a fuel cell, a gas-liquid separator configured to separate moisture from anode off gas exhausted from the fuel cell, a drain flow path through which the moisture separated by the gas-liquid separator is discharged from the gas-liquid separator, a valve provided on the drain flow path and configured to control discharge of the moisture from the gas-liquid separator, and a controller configured to control fuel cell operation and opening and closing of the valve, and determine whether the valve is frozen. Upon receipt of a stop request of the fuel cell during the fuel cell operation, the controller repeatedly determines whether the valve is frozen. If the controller determines that the valve is frozen, it continues the fuel cell operation until it determines that the valve is not frozen. If the controller determines that the valve is not frozen, it executes stop processing of the fuel cell including opening valve processing. According to the fuel cell system in this aspect, upon receipt of the stop request of the fuel cell during the fuel cell operation, the controller repeatedly determines whether the valve is frozen, and if it determines that the valve is frozen, it continues the fuel cell operation until it determines that the valve is not frozen. Therefore, waste heat generated due to the fuel cell operation can accelerate defrosting of the valve. Additionally, if the controller determines that the valve is not frozen, it executes the stop processing of the fuel cell including opening valve processing. Therefore, moisture accumulated in the vicinity of the gas-liquid separator and the valve can be discharged through the drain flow path, and thus freezing of the valve caused by this moisture can be suppressed. The expression "the valve is frozen" described above means the state in which the opening and closing operation of the valve is disturbed by frozen water. If the opening and closing operation of the valve is disturbed, gas may not flow via the valve. The expression "gas may not flow" means broad concept including the state in which the gas flow rate is less than a predetermined rate, as well as the state in which no gas flows. In addition, the expression "the valve is not frozen" means the state in which gas can flow via the valve, or the gas of flow rate equal to or higher than the predetermined flow rate can flow. It has a broad meaning including the state in which the frozen water adheres to part of the valve.

(2) In the foregoing aspect, the fuel cell system may further comprise a supply flow path through which anode gas is supplied to the fuel cell, a circulation flow path connecting the gas-liquid separator and the supply flow path in a communicating manner, and a pump provided on the circulation flow path and configured to supply the anode off gas from which the moisture has been separated by the gas-liquid separator to the supply flow path. The stop processing may include driving of the pump. According to the fuel cell system in this aspect, since the stop processing includes the driving of the pump, the flow rate of the gas flowing into the fuel cell through the supply flow path, that is, the total flow rate of the anode off gas from which the moisture has been separated and the anode gas, can be increased, compared with the state in which the pump is not driven, so that the discharge of the water accumulated in the fuel cell can be accelerated.

(3) In the fuel cell system according to the aspect described above, assuming that the stop processing including the driving of the pump is a first stop processing, the controller may execute a second stop processing that is different from the first stop processing in that it excludes the driving of the pump, even if the controller determines that the valve is frozen, when the controller determines that the valve has been continuously frozen since the receipt of the stop request of the fuel cell during the fuel cell operation until predetermined time has passed. According to the fuel cell system in this aspect, since the controller executes the second stop processing excluding the driving of the pump, when the controller determines that the valve has been continuously frozen since the receipt of the stop request of the fuel cell until the predetermined time has passed, it is possible to suppress the driving of the pump while the valve is frozen. As the operation of the fuel cell continues, an amount of the moisture accumulated in the gas-liquid separator may increase. However, according to the fuel cell system in this aspect, since the fuel cell can be stopped without driving the pump in the state in which the moisture accumulated in the gas-liquid separator has increased, the moisture accumulated in the gas-liquid separator is restrained from being sent toward and getting into the fuel cell due to the driving of the pump.

(4) In the aspect described above, the fuel cell system may further comprise the supply flow path through which anode gas is supplied to the fuel cell, the circulation flow path connecting the gas-liquid separator and the supply flow path in a communicating manner, and a pressure sensor configured to detect gas pressure in the supply flow path. The controller may determine whether the valve is frozen based on a decreasing amount of the gas pressure after transmitting an opening instruction to the valve relative to the gas pressure before transmitting the opening instruction. According to the fuel cell system in this aspect, since the controller determines whether the valve is frozen based on the decreasing amount of the gas pressure after transmitting the opening instruction to the valve relative to the gas pressure before transmitting the opening instruction, the freezing of the valve can be accurately determined. If the valve is not frozen, the opening degree of the valve is increased in response to the opening instruction so as to discharge the gas in the gas-liquid separator and the circulation flow path along with the moisture. Therefore, the gas pressure in the supply flow path communicating with the circulation flow path decreases. On the contrary, if the valve is frozen, the opening degree of the valve, when the opening instruction is transmitted, is lower, compared with the case where the valve is not frozen, and thus an amount of the gas discharged via the valve is small. Therefore, according to the fuel cell system in the aspect described above, since a difference occurs in the decreasing amount of the gas pressure before and after transmitting the opening instruction between cases with and without the freezing of the valve, the freezing of the valve can be accurately determined.

The present disclosure can be implemented in various aspects. For example, the present disclosure can be implemented in such aspects as a vehicle equipped with the fuel cell system, a method for controlling the fuel cell system, a program for implementing such a method, and a storage medium that stores this program.

What is claimed is:

1. A fuel cell system comprising:
   a fuel cell;
   a gas-liquid separator configured to separate moisture from anode off gas exhausted from the fuel cell;
   a drain flow path through which the moisture separated by the gas-liquid separator is discharged from the gas-liquid separator;
   a valve provided on the drain flow path and configured to control discharge of the moisture from the gas-liquid separator; and
   a controller configured to control fuel cell operation and opening and closing of the valve, and determine whether the valve is frozen, wherein,
   upon receipt of a stop request of the fuel cell during the fuel cell operation, the controller repeatedly determines whether the valve is frozen,
   upon determination that the valve is frozen, the controller continues the fuel cell operation until the controller determines that the valve is not frozen, and
   upon determination that the valve is not frozen, the controller executes stop processing of the fuel cell including opening valve processing.

2. The fuel cell system according to claim 1, the system further comprising:
   a supply flow path through which anode gas is supplied to the fuel cell;
   a circulation flow path connecting the gas-liquid separator and the supply flow path in a communicating manner; and
   a pump provided on the circulation flow path and configured to supply the anode off gas from which the moisture has been separated by the gas-liquid separator to the supply flow path,
   wherein the stop processing includes driving of the pump.

3. The fuel cell system according to claim 2,
   wherein assuming that the stop processing including the driving of the pump is a first stop processing, the controller executes a second stop processing that is different from the first stop processing in that it excludes the driving of the pump, even if the controller determines that the valve is frozen, when the controller determines that the valve has been continuously frozen since receipt of the stop request of the fuel cell during the fuel cell operation until predetermined time has passed.

4. The fuel cell system according to claim 1, the system further comprising:
   a supply flow path through which anode gas is supplied to the fuel cell;
   a circulation flow path connecting the gas-liquid separator and the supply flow path in a communicating manner; and
   a pressure sensor configured to detect gas pressure in the supply flow path,
   wherein the controller determines whether the valve is frozen based on a decreasing amount of the gas pressure after transmitting an opening instruction to the valve relative to the gas pressure before transmitting the opening instruction.

5. A method for controlling a fuel cell system,
the fuel cell system comprising a fuel cell, a gas-liquid separator configured to separate moisture from anode off gas exhausted from the fuel cell, a drain flow path through which the moisture separated by the gas-liquid separator is discharged from the gas-liquid separator, and a valve provided on the drain flow path and configured to control discharge of the moisture from the gas-liquid separator, the method comprising:
if a stop request of the fuel cell is received during fuel cell operation, repeatedly determining whether the valve is frozen;
if the stop request of the fuel cell is received during the fuel cell operation and it is determined that the valve is frozen, continuing the fuel cell operation until it is determined that the valve is not frozen; and
if the stop request of the fuel cell is received during the fuel cell operation and it is determined that the valve is not frozen, executing stop processing of the fuel cell including opening of the valve.

\* \* \* \* \*